United States Patent [19]

Kinder et al.

[11] Patent Number: 5,706,638

[45] Date of Patent: Jan. 13, 1998

[54] MOWER WITH AUTOMATIC POWER CUT-OFF

[75] Inventors: Mark R. Kinder; John S. Moore, both of Indianapolis, Ind.

[73] Assignee: Alitec Corporation, Brownsburg, Ind.

[21] Appl. No.: 589,553

[22] Filed: Jan. 22, 1996

[51] Int. Cl.[6] ............................................. A01D 34/60
[52] U.S. Cl. ............................. 56/10.2 E; 56/11.9; 56/7
[58] Field of Search .................... 56/10.2 E, 7, 10.2 R, 56/10.8, 11.9

[56] References Cited

U.S. PATENT DOCUMENTS

| | | | |
|---|---|---|---|
| 3,633,699 | 1/1972 | Bishop et al. | 180/53 R |
| 3,773,156 | 11/1973 | Nyquist | 192/0.094 |
| 3,874,149 | 4/1975 | Seifert et al. | 56/12.2 |
| 4,126,989 | 11/1978 | Oosterling et al. | 56/295 |
| 4,183,195 | 1/1980 | James | 56/11.9 |
| 4,206,580 | 6/1980 | Truax et al. | 56/10.4 |
| 4,570,425 | 2/1986 | Carr | 56/7 |
| 5,123,234 | 6/1992 | Harada et al. | 56/10.2 E |
| 5,299,857 | 4/1994 | Zanetis | 299/39 |
| 5,435,117 | 7/1995 | Eggena | 56/10.2 D |
| 5,497,604 | 3/1996 | Lonn | 56/7 X |

*Primary Examiner*—Terry Lee Melius
*Attorney, Agent, or Firm*—Baker & Daniels

[57] ABSTRACT

A mower including a housing having a cutting apparatus such as a flail mower rotatably mounted therein. The mower includes a detector which determines during mower raising when the housing is positioned at least a predetermined distance above the ground surface directly below the housing. After passage of a time period during which the detector continuously detects that the housing is positioned at least the predetermined distance from the ground, a signal is sent to an actuator mechanism which interrupts the delivery of power to the motor rotating the cutting apparatus such that the flail mower comes to a stop. In one embodiment, a locking mechanism can be provided which prevents power from being reintroduced to the mower motor after the mower is lowered until the operator purposefully disengages the locking mechanism.

15 Claims, 7 Drawing Sheets

5,706,638

MOWER WITH AUTOMATIC POWER CUT-OFF

BACKGROUND OF THE INVENTION

The present invention pertains to a mower intended for cutting material such as brush and grass, and, in particular, to a mower powered by a motor having an automatic power cut-off.

A variety of mowers have been designed for use in clearing brush or other undergrowth from a plot of land. While some mowers are stand-alone, dedicated pieces of machinery, other types of mowers are configured to be detachably mounted on an apparatus such as a skid-steer loader. One known type of skid-steer loader mounted mower is a rotary mower having a blade which revolves at a high rate of speed in a plane parallel to the mowed ground. One disadvantage of this mower type is the tendency to discharge at relatively high speeds debris encountered during mowing operation. A flail mower is another type of mower which may be detachably mountable to a skid-steer loader. A flail mower comprises a cylindrical cutting element with attached knives or blades which revolves about an axis generally parallel to the ground being mowed.

When using a skid-steer loader mounted mower to clear brush, an operator may be tempted to raise the lift arms of the loader to lift the mower for use in trimming hedges or smallish trees. To reduce the likelihood of injury to the mower operator or a bystander when an operator so raises the mower, some mowers have been equipped with power cut-off devices to bring mower operation to a halt.

One mower power cut-off system disclosed in U.S. Pat. No. 5,435,117 uses a camming arrangement to actuate motor power shut-off. Although suitable in some applications, this system fails to account for particularly rough terrain over which the mower can be operated. When passing over bumps and holes in the ground during mowing, on some occasions the mower can rapidly bounce up and down sufficient amounts relative to the loader to cause the motor power to be briefly shut off and then turned back on repeatedly.

Thus, it would be desirable to provide a mower with an automatic motor power cut-off which does not inadvertently activate during usage over rough terrain.

SUMMARY OF THE INVENTION

The present invention provides a mower which automatically shuts off power to the mower motor during raising of the mower off the ground. By integrating a type of time delay into the mower, such as by using a hydraulic cylinder which dampens relative movement between the mower housing and the mower support frame, the mower may be prevented from being repeatedly turned on and off during mowing of bumpy terrain. Furthermore, in one embodiment, after the mower motor has been automatically shut off during raising, the mower motor can not be restarted merely by lowering the mower, but instead the operator must purposely disengage a locking device which has automatically activated simultaneously with the initial motor power shut off.

In one form thereof, the present invention provides a mower including a housing, a cutting apparatus mounted for rotation within the housing, a motor for driving rotation of the cutting apparatus, and a motor power line in communication with a power source and the motor. The mower includes a detector for determining when the housing is positioned at least a predetermined distance from a surface below the housing, and a time delay signal sender for sending a signal after passage of a time period during which the detector continuously detects the housing is positioned at least the predetermined distance from the surface below the housing. The mower also includes an actuator mechanism for interrupting delivery of power to the motor through the motor power line in response to the signal from the time delay signal sender.

In another form thereof, the present invention provides a mower including a support frame, a housing mounted to the support frame to be vertically movable relative thereto, a cutting apparatus mounted for rotation within the housing, a hydraulic motor for driving rotation of the cutting apparatus, and a plurality of hydraulic hoses extending between the hydraulic motor and a hydraulic fluid source, wherein the plurality of hoses include a pressure line from the hydraulic source and a return line to the hydraulic source. The mower includes a detector for providing a signal when the housing moves at least a predetermined distance relative to the support frame in response to mower raising, and a hydraulic manifold including an actuating member movable in a first direction from a first position to a second position in response to the signal from the detector, wherein the manifold is adapted to deliver hydraulic power to the motor through the plurality of hydraulic hoses when the actuating member is disposed in the first position, and wherein the manifold is adapted to connect in flow communication the pressure line with the return line to bypass the motor and thereby interrupt delivery of hydraulic power to the motor when the actuating member is disposed in the second position. The mower also includes an automatic means for locking the actuating member in the second position.

In still another form thereof, the present invention provides a mower apparatus detachably mountable on a skid steer loader including a pair of raisable lift arms and a hydraulic fluid source. The mower includes a support frame including means for mounting to the skid steer loader lift arms, a housing mounted to the support frame to be vertically movable relative thereto, a cutting apparatus mounted for rotation within the housing, a hydraulic motor for rotating the cutting apparatus, a plurality of hydraulic hoses extending between the hydraulic motor and the hydraulic fluid source, wherein the plurality of hoses includes a pressure line and a return line, and at least one cylinder operationally connected to the housing and the support frame to detect relative movement therebetween, wherein the cylinder is structured to delay shifting from a first length to a second length during detection of relative movement of the housing and the support frame. The mower includes bypass means for interrupting a flow of hydraulic fluid to the motor by circuiting the pressure line to the return line, and means for sending a signal to activate the bypass means when the cylinder shifts from the first length to the second length.

One advantage of the mower of the present invention is that it automatically interrupts the delivery of power to the mower motor when the mower is raised beyond a selected height above the ground.

Another advantage of the mower of the present invention is that a provided signal delay prevents temporary and undesirable interruptions of power to the mower motor when the mower is used to mow bumpy terrain.

Still another advantage of the mower of the present invention is that after motor power is interrupted, the mower motor may be prevented from being restarted until the mower operator takes an active step, such as shutting off the high pressure hydraulic fluid delivered to a hydraulic mower motor.

BRIEF DESCRIPTION OF THE DRAWINGS

The above mentioned and other advantages and objects of this invention, and the manner of attaining them, will become more apparent and the invention itself will be better understood by reference to the following description of embodiments of the invention taken in conjunction with the accompanying drawings, wherein.

Figure 1:
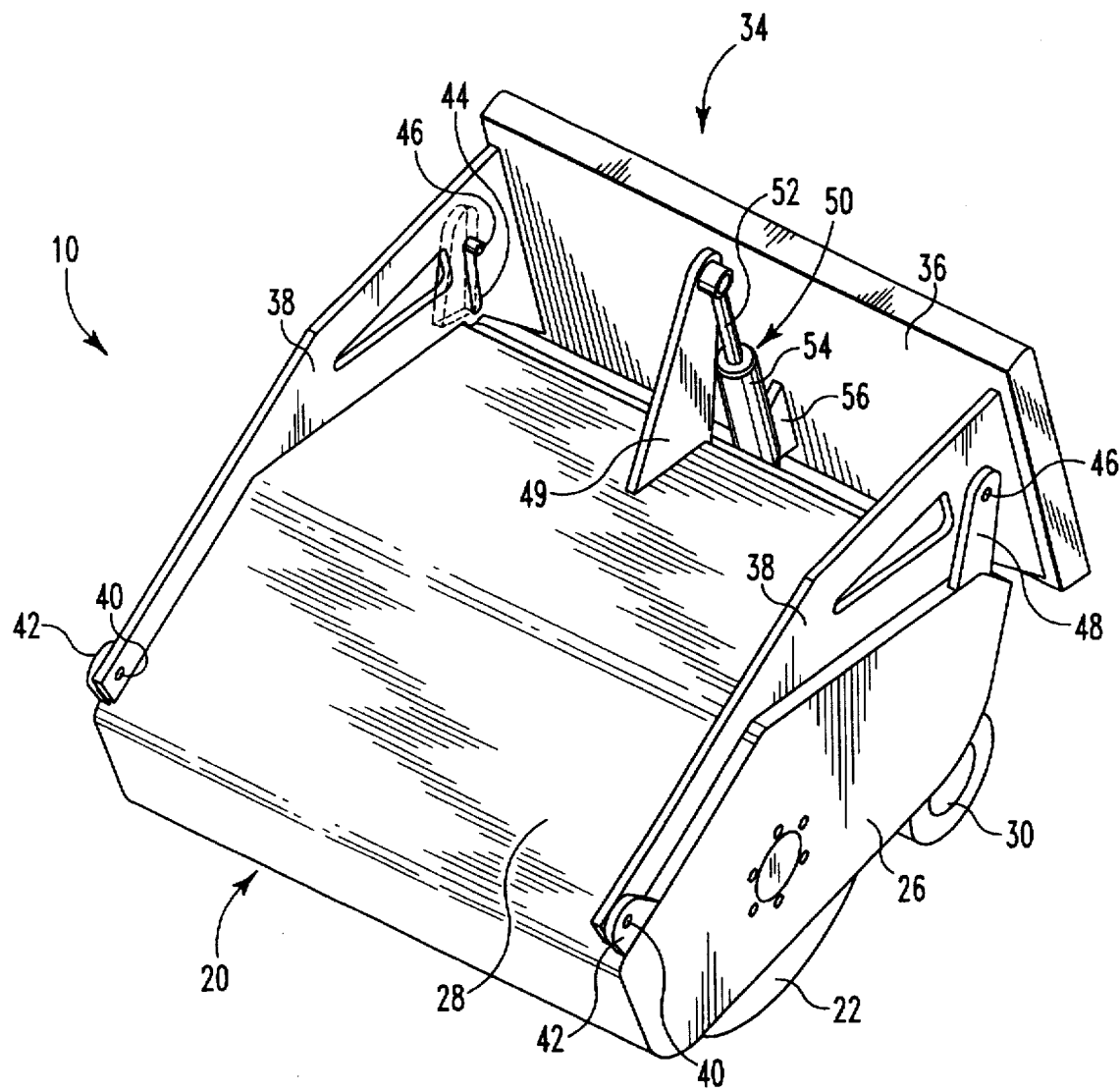
FIG. 1 is a perspective view of select portions of a mower configured according to the present invention and in a mowing arrangement.

Corresponding reference characters indicate corresponding parts throughout the several views. Although the drawings represent embodiments of the invention, the drawings are not necessarily to scale and certain features may be exaggerated or omitted in order to better illustrate and explain the present invention.

DESCRIPTION OF THE PREFERRED EMBODIMENTS

Figure 2:
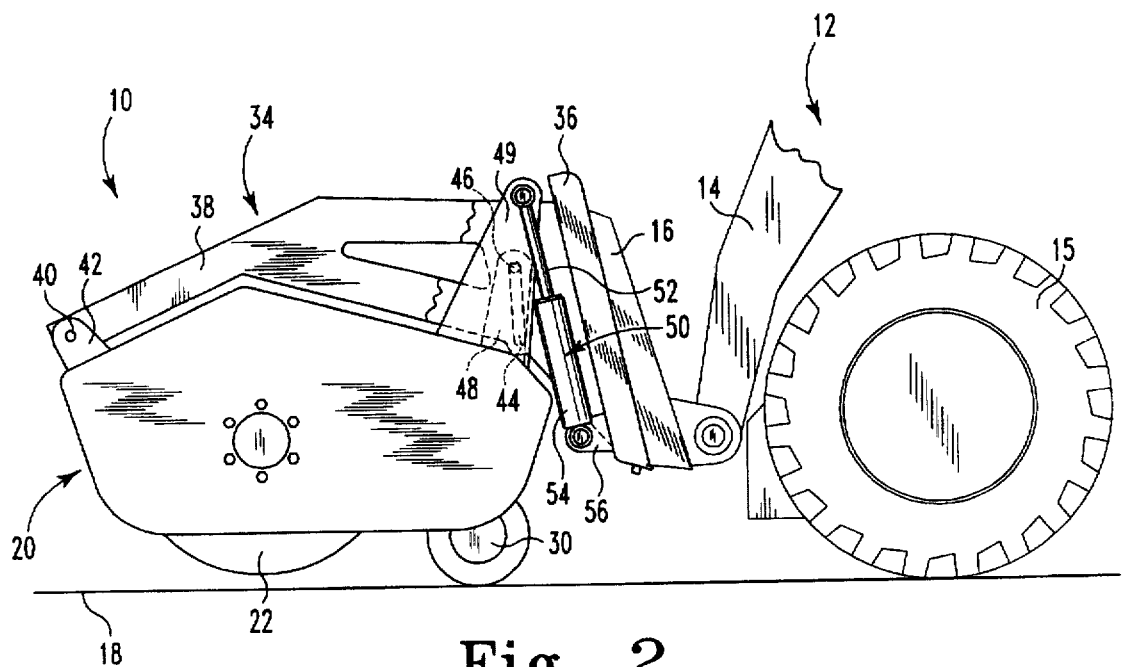
FIG. 2 is a side view in partial cutaway of the mower of FIG. 1 operationally mounted on an abstractly shown skid-steer loader and in a lowered, mowing arrangement.

Referring now to FIGS. 1 and 2, there is shown in perspective view and side view, respectively, a mower configured according to the present invention. Only select portions of the mower are shown in detail in these Figures. Certain structural portions of the mower which may be of any suitable type known in the art have been abstractly shown or omitted in the interest of clarity of illustration, and further because the construction of such portions are not essential to an understanding of the present invention.

The mower is generally designated 10 and is shown employed as a detachably mountable accessory for a self-propelled vehicle. The self-propelled vehicle is partially shown in FIG. 2 as a skid-steer front end loader 12 including front wheels 15 and a pair of raisable and lowerable lift arms 14 which flank opposite sides of the loader cab. Additional details of loader 12 are generally omitted herein as such details are well known as described in U.S. Pat. No. 5,299,857, which is expressly incorporated herein by reference. Although further described herein with reference to use as a loader attachment, the mower of the present invention may find beneficial application with other types of self-propelled vehicles or as a stand alone unit, and therefore the following explanation will be appreciated by skilled artisans as exemplary and not limiting.

Mower 10 is illustrated as a flail mower including a housing or chassis 20 which houses the cylindrical cutting element with included blades abstractly shown at 22. Other cutting elements or chassis configurations may be substituted within the scope of the invention as will be appreciated from the following description. The width of chassis 20 and cutting element 22 can be provided in various dimensions, but is typically expected to extend the entire width or more of loader 12 to provide suitable mowing capacity. The hydraulic motor powering the revolution of cutting element 22 is represented at 24 in FIG. 4 and may be mounted to chassis 20 in any known fashion.

Chassis 20, which includes opposite side or lateral end plates 26 and top cover 28, aids in containing debris otherwise flung from cutting element 22 as well as limits access to the rotating cutting element 22. A ground engaging depth roller 30 is mounted to chassis 20 and extends below the bottom edges of chassis side plates 26.

Chassis 20 is suspended from a support frame, generally designated 34, that is detachably mountable to loader 12. Support frame 34 includes a loader attachment plate, abstractly shown as a solid plate at 36, that includes linkage mechanisms allowing for ready attachment and detachment with mounting plate or pads 16 connected to loader arms 14. Attachment plate 36 need not be a solid plate as other framework configurations that are attachable to the loader may be employed. The linkage mechanisms are not shown in detail as they may be of any conventional design and are not material to the invention. Adjustments to the angle the loader attachment plate 36 makes with the ground 18 by pivoting mounting plate 16 relative to lift arms 14 in a well known manner permits the cutting height of the flail mower to be adjusted due to the effective pivoting of cutting element 22 relative to roller 30, which remains in contact with the ground during this pivoting. Forwardly extending from attachment plate 36 and rigidly attached to plate 36 at either end are a pair of frame arms 38. At their anterior tips, frame arms 38 are pivotally connected at 40 with upwardly extending ears 42 fixed to chassis top cover 28. Each frame arm 38 also includes a guide slot 44 which receives a stop pin 46 laterally projecting from an ear 48 upwardly extending from chassis 20.

Centrally located along the width of chassis top cover 28 is a signal cylinder mounting ear 49. A hydraulic signal cylinder generally designated 50 includes a rod 52, which is attached to the upper end of mounting ear 49, and a piston housing cylinder portion 54 attached to lug 56 fixed to attachment plate 36. The hydraulic lines in communication with the opposite ends of signal cylinder 50 are not shown in FIGS. 1 and 2 for clarity of illustration.

Figure 3:
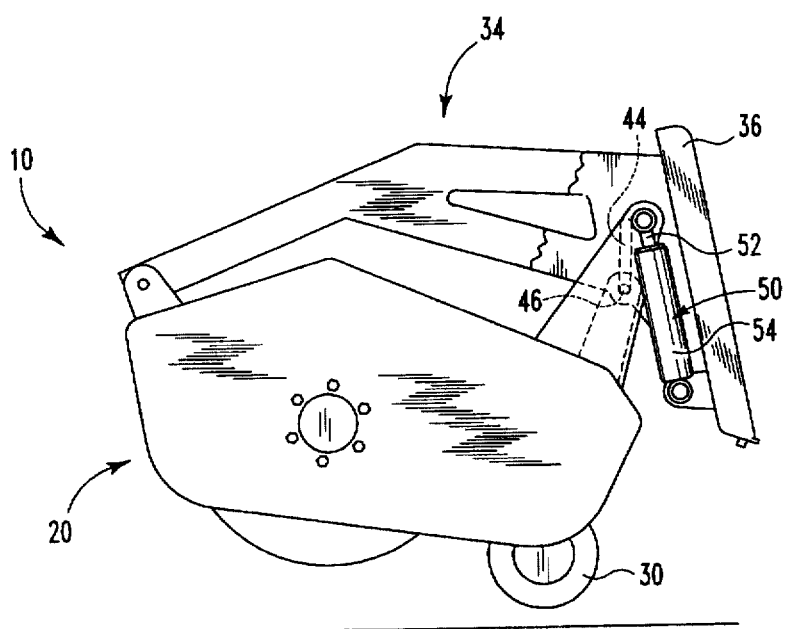
FIG. 3 is a side view in partial cutaway of the mower of FIG. 1 in the process of being raised during which the mower motor power is automatically cut-off.

When the loader arms 14 are in a lowered position, such as when the hydraulics controlling their raising are deactivated by placing the hydraulic control lever in the loader cab into the float position, mower 10 assumes the orientation shown in FIG. 2. Depth roller 30 contacts the ground and signal cylinder 50 is in the extended arrangement shown. The engagement of the upper end of guide slots 44 by stop pins 46 limits how low the loader lift arms settle relative to the rear portion (toward the loader) of mower 10. When the loader arms 14 are raised to effect raising of the support frame 34, chassis 20 begins to pivot under gravity relative to support frame 34 around pivot points 40 with depth roller 30 initially remaining in contact with the ground. During this pivoting, signal cylinder rod 52 is forced into cylinder portion 54 until stop pins 46 abut the lower ends of guide slots 44 to prevent further chassis motion relative to the frame. Further raising of support frame 34 lifts chassis 20 and roller 30 off the ground, at which point mower 10 is oriented as shown in FIG. 3.

Figure 4:
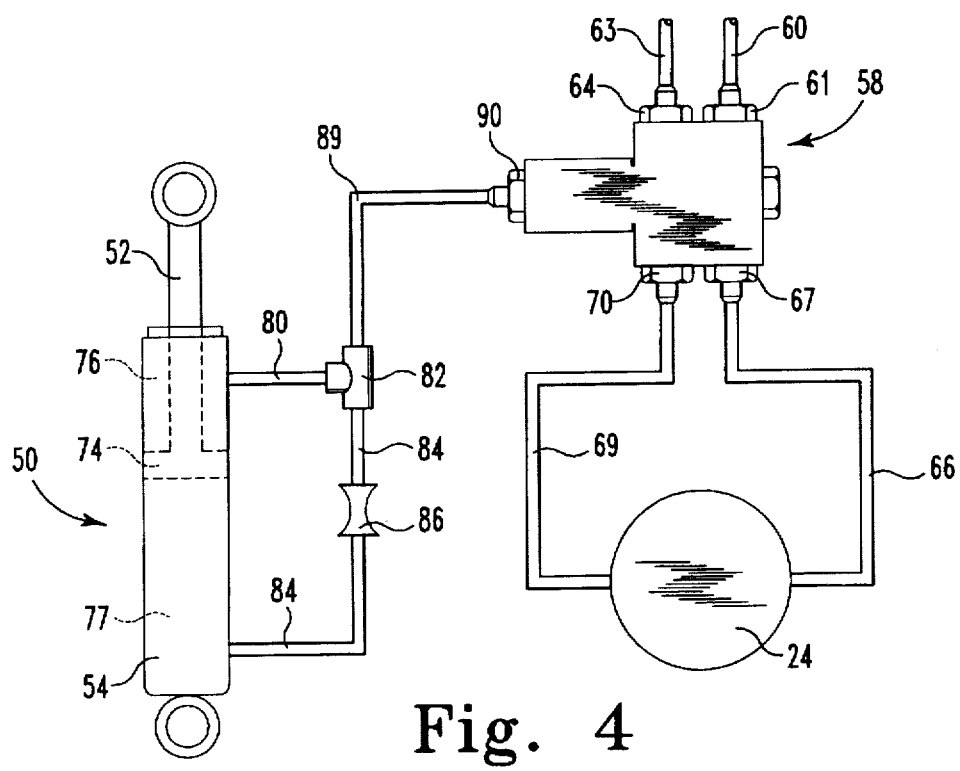
FIG. 4 is a schematic of the hydraulic circuitry of the mower of FIG. 1.
Figure 5:
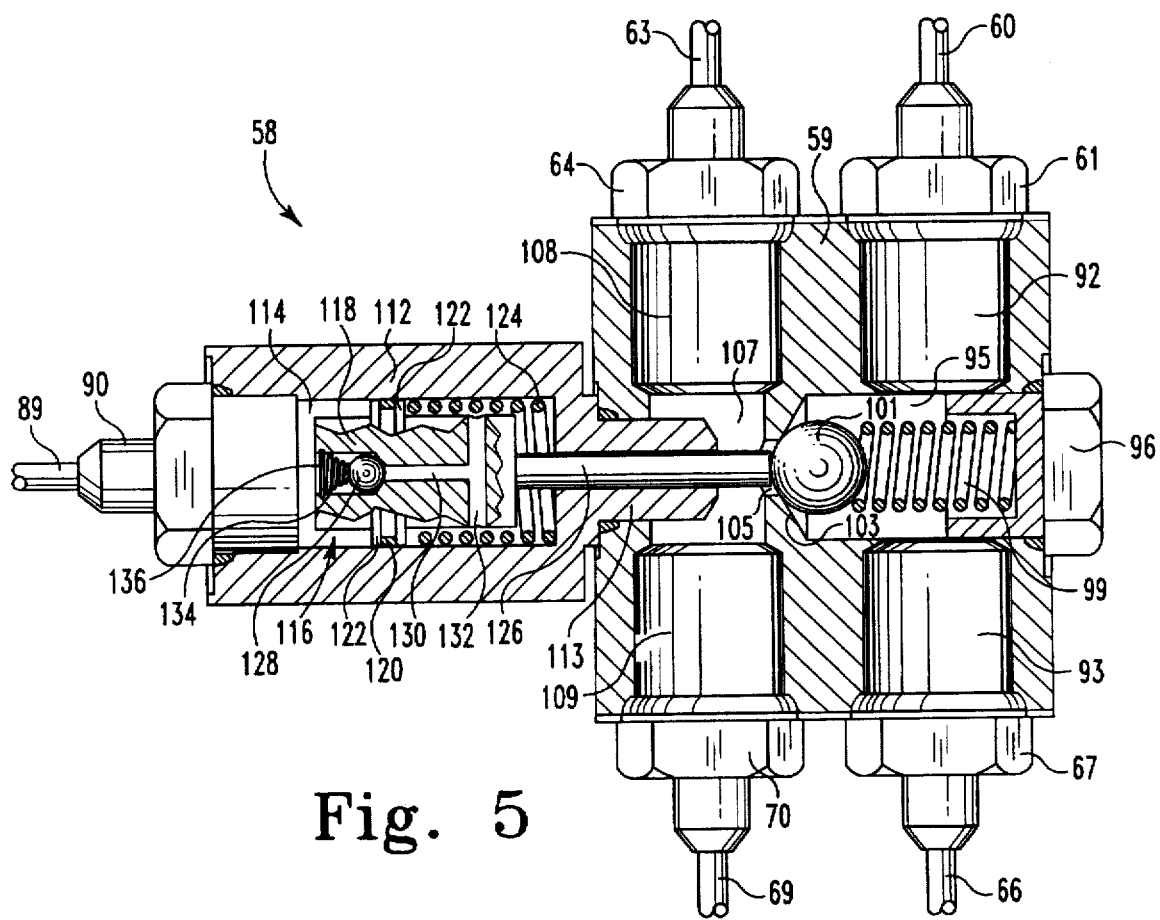
FIG. 5 is an enlarged view in partial cross-section of a hydraulic manifold of the mower of FIG. 1.

The preferred hydraulic circuitry of the mower power shut-off system of the present invention will be better understood with reference to FIGS. 4 and 5. FIG. 4 is a schematic of the overall hydraulic circuitry, and FIG. 5 is an enlarged view in partial cross-section of the hydraulic manifold. The hydraulic manifold, generally designated 58, will typically be mounted to the mower chassis 20, but may be mounted at alternative locations, such as on frame structure 34. Hydraulic manifold 58 is connected to the high pressure side of a hydraulic fluid source of loader 12 via hydraulic line or hose 60 and fitting 61. Hose 63 connected to manifold 58 via fitting 64 serves as the low pressure return line to the loader hydraulic source. The mower motor 24 is powered by a flow of high pressure hydraulic fluid passing from manifold 58 through fitting 67 and hose 66, and return line 69 and fitting 70 return low pressure hydraulic fluid from motor 24 to manifold 58.

Signal cylinder 50 is schematically shown in FIG. 4 removed from the chassis 20 and frame structure 34. Signal cylinder 50 is a conventional cylinder, such as a cylinder available from Columbus Hydraulics of Columbus, Neb. The distal end of rod 52 is connected to a slidable, circumferentially sealed piston component 74 which separates the interior volume of cylinder portion 54 into an upper chamber indicated at 76 and a lower chamber indicated at 77.

Hose 80 extends between a cylinder port into chamber 76 and tee fitting 82. Hose 84 extends between a cylinder port into chamber 77 and tee fitting 82. A delay control orifice, which is abstractly shown at 86, is disposed within hose 84. Delay control orifice 86 is an orifice of smaller diameter than the hose and slows the rate at which piston component 74 can react to forces exerted on rod 52 due to movements of chassis 20 relative to frame structure 34. Delay control orifice 86, the size of which can be selected by those of skill in the art to achieve the desired time delay or response rate for the system, may be provided within either of hoses 80, 84 or within the fittings (not shown) used to connect these hoses to cylinder portion 54. Another hydraulic line 89 which serves as the conduit for a hydraulic signal which initiates motor power cut-off extends between tee fitting 82 and a fitting 90 connected to manifold 58.

Hydraulic manifold 58 will be further described with particular reference to FIG. 5. Between chambers 92 and 93 and in fluid flow communication therewith is chamber 95 cross-drilled into the aluminum block or housing 59. Although not shown for purposes of clarity of illustration, outboard portions of the walls of chambers 92 and 93 are threaded to mate with the threads of fittings 61 and 67. Chamber 95 is capped by an externally threaded hydraulic plug 96 having a cylindrical cavity in which fits spring 99. Recirculation ball 101 is biased by spring 99 against frustoconical seat portion 103 to seal bypass conduit 105 in FIG. 5.

Screwed into a threaded cross bore opposite plug 96, and opening into conduit 107 between fitting receiving chambers 108 and 109, is pilot housing 112. Fitting 90 is screwed into the outboard portion of housing 112 and opens into cylindrical interior chamber 114. A plunger member, generally designated 116, includes a piston body 118 circumferentially sealed by O-ring 120 retained between annular shoulders 122. Spring 124 is interposed between the inboard annular shoulder 122 and the inward end of interior chamber 114 to provide an outward biasing force (to the left in FIG. 5) on plunger member 116. Spring 124 is shown in a substantially uncompressed state in FIG. 5. Inwardly extending from piston body 118 is a plunger rod 126 which may be integrally formed or fixedly attached to piston body 118. Plunger rod 126 extends through a bore in an externally threaded pilot housing nose portion 113 for abutting engagement with recirculation ball 101. To allow hydraulic fluid within conduit 107 to reach the inboard or right side portion of interior chamber 114 in which spring 124 is disposed, plunger rod 126 is sized and shaped to provide a diametral clearance with the bore through housing nose portion 113. A hydraulic communication between conduit 107 and interior chamber 114 may alternatively be provided by providing a flat along the axial length of the otherwise cylindrical plunger rod 126, or by providing a pair of cross bores in rod 126 opening into conduit 107 and chamber 114 and connected by an axial bore in rod 126.

Within piston body 118 is a makeup check valve including a spring biased ball 128 that seals an axial bore 130 that communicates with interior chamber 114 through cross bores 132. Bore 130 could alternatively extend the entire length of body 118 and rod 126 such that fluid in conduit 107 can directly reach ball 128. Ball 128 is seated by spring 134, which is held by a retaining member 136 secured within a groove formed in piston body 118.

The structure of mower 10 shown in FIGS. 1–5 will be further understood in view of the following explanation of its operation. With lift arms 14 lowered such that mower 10 is positioned in a ground engaging, mowing orientation as shown in FIG. 2, the hydraulic mower is powered or energized to cause the flail mower cutting element 22 to revolve. High pressure hydraulic fluid at about 2500 psi flows through hose 60 into hydraulic manifold 58 and out through hose 66 to the pressure port of motor 24. Recirculation ball 101 will be seated at start-up such that hydraulic fluid input at chamber 92 passes through chamber 95 and out chamber 93 initially and does not pour through bypass conduit 105. After drivingly circuiting through motor 24, the hydraulic fluid passes out from the return port of motor 24 and through hose 69 into the low pressure side of hydraulic manifold 58, and back through return line 63 at between about 200 psi and about 300 psi to the loader hydraulic source. As the low pressure hydraulic fluid passes through manifold 58 when the mower is first started, a portion of the hydraulic fluid enters the interior chamber 114 of pilot housing 112 through the diametral clearance around plunger rod 126 and fills bores 132 and 130 within plunger body 118. Hydraulic fluid, such as a quantity of fluid which is factory installed, will normally already fill signal cylinder 50 and its associated hoses up through the portion of inner chamber 114 outboard of piston body 118. Ball 128 of the make-up valve allows hydraulic fluid to pass to the portion of interior chamber 114 to the left of piston body 118 such that any air potentially therein can be purged from chamber 114. At this point of operation, hydraulic manifold 58 will generally be configured as shown in FIG. 5, although plunger rod 126 may be spaced from ball 101.

As mower 10 traverses ground 18, it may experience rough terrain including depressions or holes into which chassis 20, and in particular roller 30, could be expected to dip under gravity. Rapid movements of the mower chassis 20 relative to frame structure 34 which might otherwise occur on contacting such depressions or bumps are dampened by the dash-pot effect produced by hydraulic cylinder 50. For example, orifice 86 slows the rate at which hydraulic fluid within chamber 77 can be displaced by sliding movement of piston component 74 further into cylinder portion 54. Consequently, cylinder 50 will not immediately shorten an amount equal to the depression encountered by roller 30 during operation, but instead the shortening is delayed. Cylinder 50 will shorten or compress appreciable amounts when the compressive force is sufficiently continuously applied, such as when chassis 20 settles downward relative to frame structure 34 during mower lifting as described above. Those of skill in the art will recognize that making orifice 86 larger will decrease the time delay or dampening of the system, while a smaller orifice will increase the dampening or time delay.

Signal cylinder 50 effectively detects the mower raising by experiencing a force which causes its rod 52 to insert further into cylinder portion 54. As rod 52 inserts, hydraulic fluid within chamber 77 passes through hose 84, orifice 86, and hose 80 into chamber 76, which increases in volume as piston component 74 moves downward. Because rod 52 occupies in chamber 76 a volume previously filled with fluid in chamber 77, a volume of displaced hydraulic fluid at high pressure which serves as a hydraulic signal is forced through tee fitting 82 and into hose 89, through fitting 90 and into the left hand portion of chamber 114 within pilot housing 112. This volume of high pressure fluid biases plunger body 116 and therefore rod 126 to the right to unseat recirculation ball 101 from contact with seat portion 103 against the returning forces provided by plunger spring 124 and recirculation ball spring 99.

The extent to which plunger member 116 shifts to the right to move recirculation ball 101 depends on the amount of hydraulic fluid displaced within cylinder 50 and injected through hose 89 into chamber 114. The degree of cylinder shortening which effects an adequate hydraulic signal to cause recirculation ball unseating is a matter of design choice to one of skill in the art. For example, the manufacturer may provide that only a hydraulic signal produced by a nearly complete cylinder stroke, such as shown occurring between FIGS. 2 and 3 and which is limited by the cooperative engagement of stop pins 46 with guide slots 44, will unseat recirculation ball 101. Alternatively, the system may be designed such that insertion of rod 52 into cylinder portion 54 a distance less than the total cylinder stroke initially unseats circulation ball 101, and further cylinder compression merely shifts ball 101 further to the right in FIG. 5. Thus, the manufacturer can allow for mower power interruption at preselected distances the chassis 20 moves relative to frame structure 34.

When recirculation ball 101 is unseated, power to motor 24 is interrupted. In particular, hydraulic fluid entering chamber 92 from hose 60 takes the path of least resistance and attempts to pass through bypass conduit 105 rather than into hose 66. Fluid exiting bypass conduit 105 into conduit 107 then proceeds through chamber 108 and return hose 63 to the loader hydraulic source. Motor 24 coasts to a stop with the fluid in hoses 66, 69 and motor 24 at the time of power interruption being free to empty into chamber 109 under force of the inertia of the motor 24, cutting element 22 and fluid.

When mower 10 is subsequently lowered, which causes chassis 20 by way of roller 30 to reach the ground and eventually extend cylinder rod 52 out of cylinder portion 54, the hydraulic displacement from signal cylinder 50 is eliminated and plunger member 116 returns to the left under the force of spring 124. Recirculation ball 101 is reseated by spring 99, which allows high pressure hydraulic fluid from hose 60 to again reach and power motor 24.

While mower motor power interruption is described with reference to a time delayed hydraulic signal that serves to activate the plunger, other configurations are within the scope of the invention. For example, plunger rod 126 may alternatively be shifted by an electrical element such as a solenoid that receives an electrical signal from a detector such as cylinder 50 during mower raising. Rather than the cylinder 50, other detector elements which preferably incorporate a time delay, such as an electrical switch adapted to signal mower raising only after it is switched on by chassis 20 movement relative to frame structure 34 and remains on for a time delay period, may be substituted.

Figure 6:
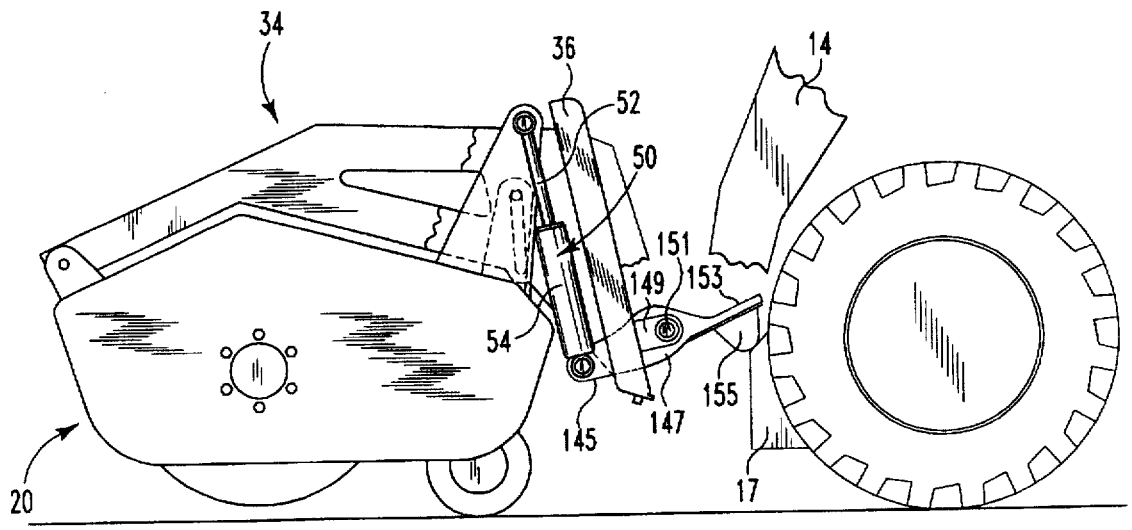
FIG. 6 is a side view in partial cutaway of another embodiment of a mower of the present invention operationally mounted on an abstractly shown skid-steer loader and in a lowered, mowing arrangement.
Figure 7:
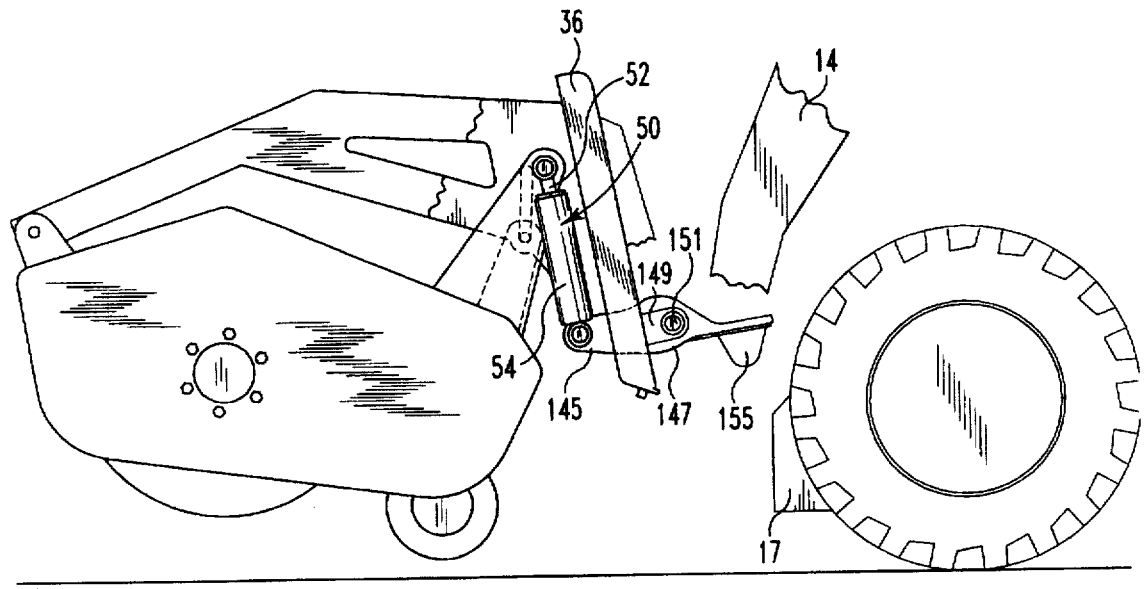
FIG. 7 is a side view in partial cutaway of the mower of FIG. 6 in the process of being raised.

Referring now to FIGS. 6 and 7, there is shown another embodiment of the mower of the present invention. The mower is constructed identical to mower 10 in all respects but the attachment of cylinder 50 to the frame structure and the cylinder construction. Therefore, corresponding parts are similarly numbered. In this embodiment, cylinder 50 is a spring return cylinder with a compression spring (not shown) between the piston component 74 and top of cylinder portion 54 to bias rod 52 into cylinder portion 54. Cylinder portion 54 is mounted to a first end 145 of a rocker 147 that extends through an opening provided in attachment plate 36. A pair of lugs 149 fixedly attached to plate 36 and rearwardly extending therefrom flank rocker 147 on either side and pivotally mount rocker 147 at 151. Rocker second end 153 includes a downwardly extending protuberance 155. When lift arms 14 are in a lowered orientation shown in FIG. 6, rocker protuberance 155 engages loader bumper 17, which causes rocker 147 to assume the shown position extending cylinder 50. When lift arms 14 are subsequently lifted, rocker protuberance 155 is lifted away from bumper 17. During this lifting, rocker 147 rotates in a clockwise direction in FIGS. 6 and 7 toward the position shown in FIG. 7. This rotation may be effected by the compression spring (not shown) within spring return cylinder 50, or alternatively by a separate spring mechanism (not shown) such as attached between rocker 147 and attachment plate 36. When rocker 147 rotates to the position shown in FIG. 7, first end 145 shifts upward to aid in the shortening or compression of cylinder 50 which produces the hydraulic signal used to interrupt motor power.

Figure 8:
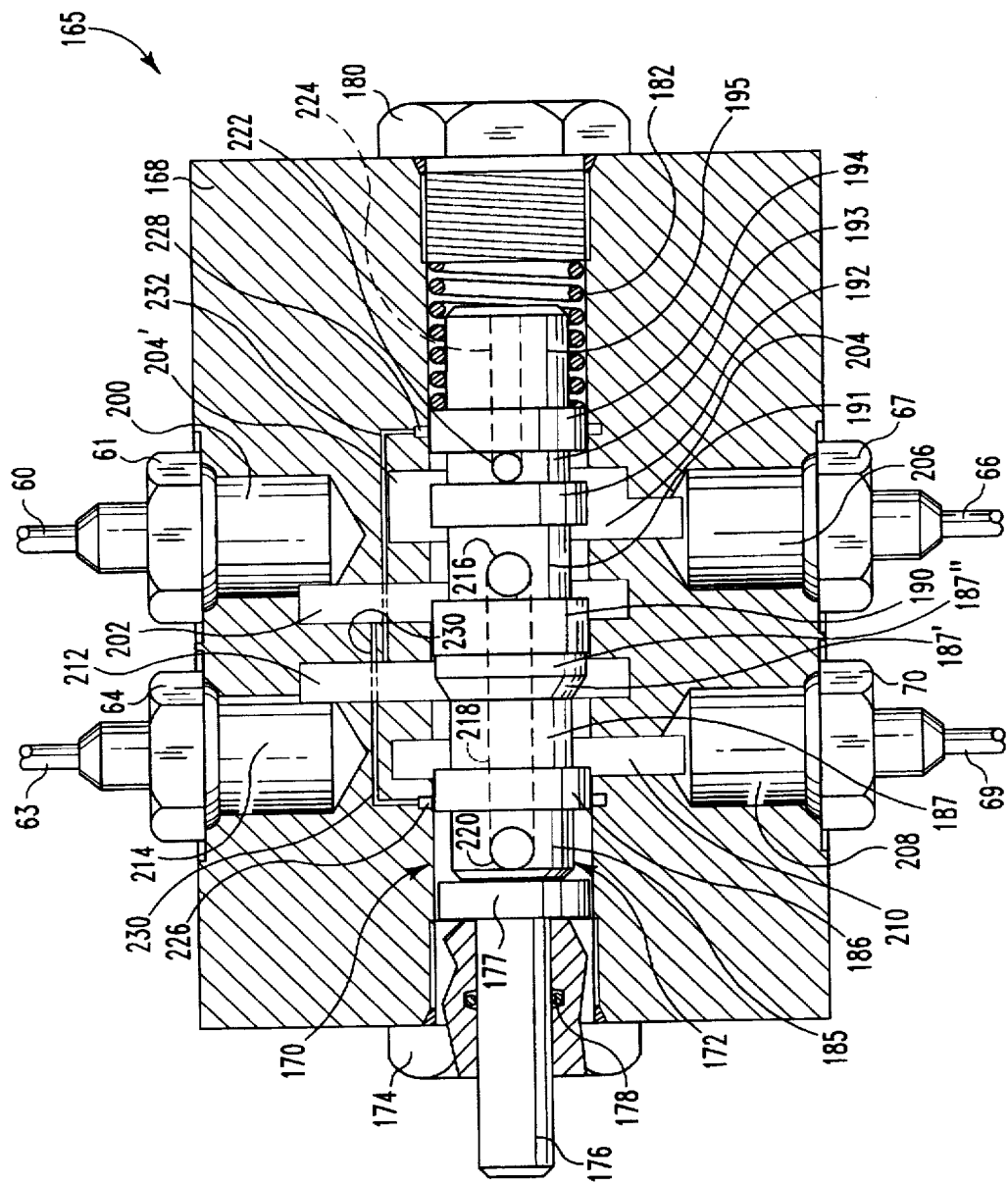
FIG. 8 is an enlarged view in partial cross-section of a hydraulic manifold of another embodiment of the present invention, wherein the manifold is arranged such that power is delivered to the mower motor.
Figure 9:
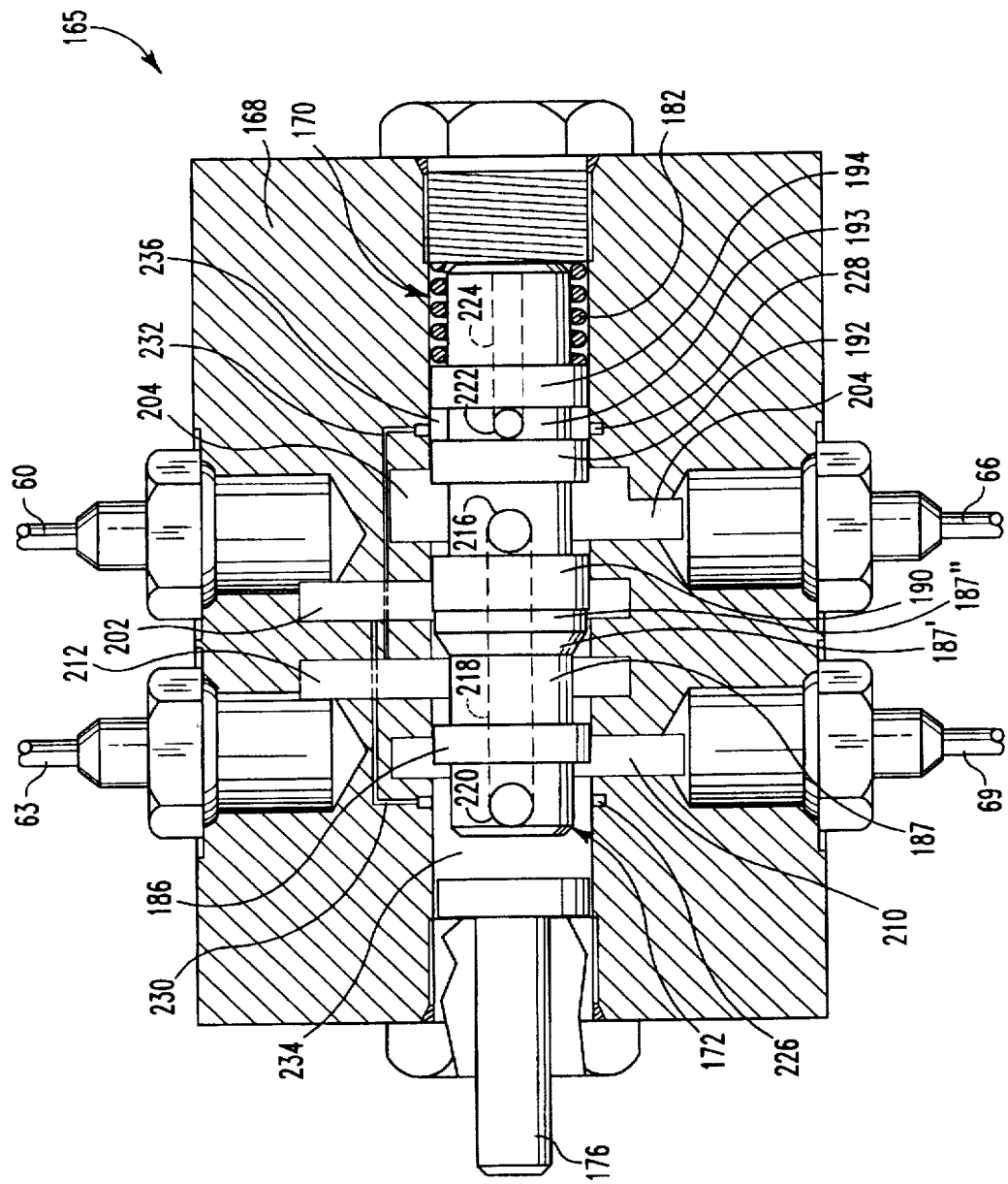
FIG. 9 is the hydraulic manifold of FIG. 8 after being shifted to an arrangement interrupting power to the mower motor upon the raising of the mower from the ground.

Referring now to FIGS. 8 and 9, there is schematically shown the hydraulic manifold of another embodiment of a mower of the present invention in motor power on and motor power off arrangements respectively. In this mower embodiment, the majority of the components other than the hydraulic manifold are similarly configured to the embodiment shown in FIGS. 1–5. Therefore, the similar components are identified by similar reference numerals, and further explanation of such components is limited.

The hydraulic manifold, generally designated 165, includes a housing block 168 including a cylindrical bore, generally designated 170, that extends the entire housing width. A spool, generally designated 172, slidably extends within bore 170. An externally threaded hydraulic plug 174 caps one end of bore 170. Plunger 176 includes a disk shaped end 177 and longitudinally slides within plug 174 and is sealed by O-ring 178. Plunger 176 may be axially shifted in a variety of ways within the scope of the invention to affect motor power shut off. For example, although not shown, hose 89 from signal cylinder 50 may be operatively attached with plug 174 and plunger 176 such that the hydraulic displacement associated with cylinder shortening hydraulically biases plunger 176 to the right in FIG. 8. In another embodiment not shown, a mechanical signal rather than a hydraulic signal produces plunger motion. In that embodiment, hydraulic hose 89 to the manifold is eliminated and manifold 165 is mounted to attachment plate 36 and oriented with the outboard end of plunger 176 pointed up. A substantially rigid actuating bar includes a first end fixedly mounted to chassis top cover 28 and a second actuator end positioned directly above plunger 176. When the mower is in the mowing arrangement as shown in FIG. 2, the bar actuator end is spaced apart from plunger 176. During mower raising, when cylinder 50 shortens as chassis 20 settles relative to support frame 34, the bar actuator end lowers with chassis 20 and directly contacts plunger 176 to force the plunger farther into manifold housing 168 to bias spool 172 downward. For such a configuration, cylinder 50 provides a suitable time delay. In still another embodiment, plunger 176 and plug 174 may be replaced with fitting 90 connected to hose 89 from the embodiment of FIGS. 1–5, such that the hydraulic signal from signal cylinder 50 is in direct contact with spool 172.

Externally threaded hydraulic plug 180 caps the opposite end of housing bore 170 and seats centering spring 182 that biases spool 172 to the left in FIG. 8.

Along its axial length, spool 172 includes cylindrical body segments 185, 187, 191, 193 and 195. Spool 172 further includes annular flanges or lands 186, 190, 192 and 194 disposed between adjacent body segments. Body segment 187 includes a frutoconical section 187' and a larger diameter annular portion 187" slightly smaller than the diameter of spool land 190 to provide a pressure creating, diametral clearance with housing 168 as described further below. Lands 186, 190, 192 and 194 are sized and shaped complementary to cylindrical bore 170 so as to sealingly cooperate with housing 168 at selected times during mower operation to limit the escape of pressurized fluid flow axially along spool 172. Lands 186, 190, 192 and 194 thereby provide a means to selectively compartmentalize bore 170 into separate chambers around body segments 185, 187, 191, 193 and 195.

During normal operation when the mower is in a lowered, mowing orientation, high pressure hydraulic fluid is inlet via hose 60 and fitting 61 into chamber 200. This fluid then passes through duct 202 that opens into chamber 200, through the portion of bore 170 surrounding body segment 191, through duct 204, and into chamber 206 from where it is outlet through fitting 67 and hose 66 to motor 24.

Lower pressure hydraulic fluid returning from motor 24 is inlet via hose 69 and fitting 70 into chamber 208. This fluid then passes through duct 210, through the bore portion surrounding body segment 187, through duct 212, and into chamber 214 from where it is outlet through fitting 64 and hose 63 back to the loader. Each of ducts 202, 204, 210 and 212 surrounds spool 172 and is generally tear-drop in shape with spool 172 extending through the larger, base portions of the tear-drop ducts. Duct 204 also is shown including a widened annular portion 204. Other duct shapes may alternatively be employed.

During mowing operations, a quantity of the high pressure fluid flowing through the portion of bore 170 around body section 191 enters cross bore 216 within spool 172, passes through a spool axial bore indicated at 218, and outlets into the bore portion surrounding body segment 185 through cross bore 220. Land 186 seals against housing 168 to prevent the fluid around body segment 185 from entering duct 210 which is at a lower pressure. A quantity of high pressure fluid within duct portion 204 and the bore volume around body segment 192 passes through cross bore 222 and axial bore 224 into the bore portion in which body segment 195 and spring 182 are located. From the foregoing, it will be appreciated that spool 172 is hydraulically balanced as the total hydraulic forces acting in one axial direction on spool 172 are equal to the hydraulic forces acting in the opposite axial direction on spool 172, and therefore spring 182 urges spool 172 to the position shown in FIG. 8.

At this point of operation, spool lands 186 and 194 cover or block annular grooves 226 and 228, which are used to lock spool 172 in a motor power shut-off arrangement as described further below. Annular groove 226 is connected to an abstractly shown high pressure pilot conduit 230 formed in housing 168 that ports into high pressure duct 202. Although shown for purposes of illustration in dashed lines passing through low pressure duct 212, conduit 230 is not in communication with duct 212 and typically will be located in housing 168 so as to not physically pass through duct 212. Annular groove 228 is similarly connected to an abstractly shown low pressure pilot conduit 232 formed in housing 168 that ports into low pressure duct 212. And, analogous to conduit 230, conduit 232 does not port into duct 202 through which its passage is shown in dashed lines. In alternate embodiments not shown, pilot lines 230, 232 may be placed in direct fluid communication with hoses branched off of hoses 60 and 63 rather than with ducts formed in housing 168.

When plunger 176 is actuated as described above, spool 172 is forced to the right against the return force provided by the compression of spring 182. When spool 172 reaches the axial position shown in FIG. 9, the flow of pressurized fluid to motor 24 is interrupted such that the motor coasts to a stop. As described further below, until the loader auxiliary hydraulics are purposefully turned off, the spool is hydraulically locked in the motor power shut off arrangement even if the plunger returns to the left as shown in FIG. 9.

Referring now to FIG. 9, after spool 172 shifting which occurs during mower raising as described above, spool land 190 sealingly engages housing 168 to prevent fluid in duct 202 from flowing toward duct 204. As a result, fluid entering duct 202 is redirected through the diametral clearance between housing 168 and annular portion 187" and frutoconical section 187', into the bore portion around body segment 187, and then into duct 212 for return to the loader hydraulic source. Around its circumference, land 186 seals with housing 168 to prevent fluid in duct 212 from reaching duct 210. The diametral clearance is designed to serve as an orifice which produces a small pressure gradient between duct 202 and duct 212. For example, fluid entering duct 202 at this point of operation will be at about 500 psi and fluid flowing from duct 212 will be at about 200 psi.

Upon spool shifting, land 186 moves clear of groove 226 to allow the portion of the bore labeled as 234 to communicate with duct 202 via pilot conduit 230 and groove 226. Although plunger 176 is shown in the extended orientation it will assume after the mower has been lowered, before mower lowering plunger 176 may be in contact with spool 172 without interfering with mower power cut-off. Due to the communication with duct 202, bore portion 234 and the duct 210 into which it opens are at the high pressure of about 500 psi. Duct 204 is also at this high pressure due to its communication with bore portion 234 through cross bore 220, axial bore 218 and cross bore 216. It will be appreciated that because ducts 204 and 210 are at equal pressures, no pressure differential is provided across motor 24 by hoses 66 and 69, and motor power is therefore effectively shut off. Motor 24 is allowed to coast to a stop with fluid outlet from hose 69 during the motor stopping circulating through duct 210, bore portion 234, bores 220, 218, 216, and then duct 204 back to hose 66.

Upon spool shifting, land 194 moves clear of groove 228 to allow the portion of bore 170 surrounding body segment 193 (identified at 236) to communicate with low pressure duct 212 via pilot conduit 232 and groove 228. As a result, bore portion 236 is at the low pressure of about 200 psi. The bore portion in which spring 182 is located is also filled with fluid at this low pressure due to its communication with bore portion 236 via axial bore 224 and cross bore 222. Spool land 192 sealingly engages housing 168 to prevent relatively high pressure fluid in duct 204 from escaping to bore portion 236.

It will be appreciated that the relatively high pressure fluid within bore portion 234 provides an axial force on spool 172 opposite to axial forces provided by spring 182 and the relatively low pressure fluid around spring 182. The difference between the high and low pressures is sufficient to create a force on spool 172 acting to the right in FIG. 9 greater than the returning force of spring 182, and consequently as long as the loader hydraulic source is providing a flow of fluid to manifold 165 through hose 60, spool 172 remains hydraulically locked in an arrangement where power is not delivered to mower motor 24. Only after mower 10 is lowered, and then only when the loader operator halts the flow of fluid to manifold 165 through hose 60 from loader 12 by switching off the loader auxiliary hydraulics will the pressure differential be eliminated so as to allow spring 182 to automatically shift spool 172 to the mower power on arrangement shown in FIG. 8 and thereby reset manifold 165 such that a subsequent restarting of the hydraulic fluid supply will again power mower motor 24.

While a hydraulic locking mechanism preventing spool 172 from returning to a motor power on position is shown, other locking mechanisms involving mechanical or electrical devices may be substituted within the scope of the invention. For example, a spring biased locking pin extendable into bore 170 may be provided which cooperates with a recess in spool 172. When spool 172 is shifted from the mower power on position shown in FIG. 8 to the motor power off position shown in FIG. 9, the pin shifts into engagement with a spool recess to prevent further axial movements of spool 172. The spring biased locking pin would need to be manually retracted by an operator in order to reset the manifold such that hydraulic power can again be circuited to the mower motor.

Figure 10:
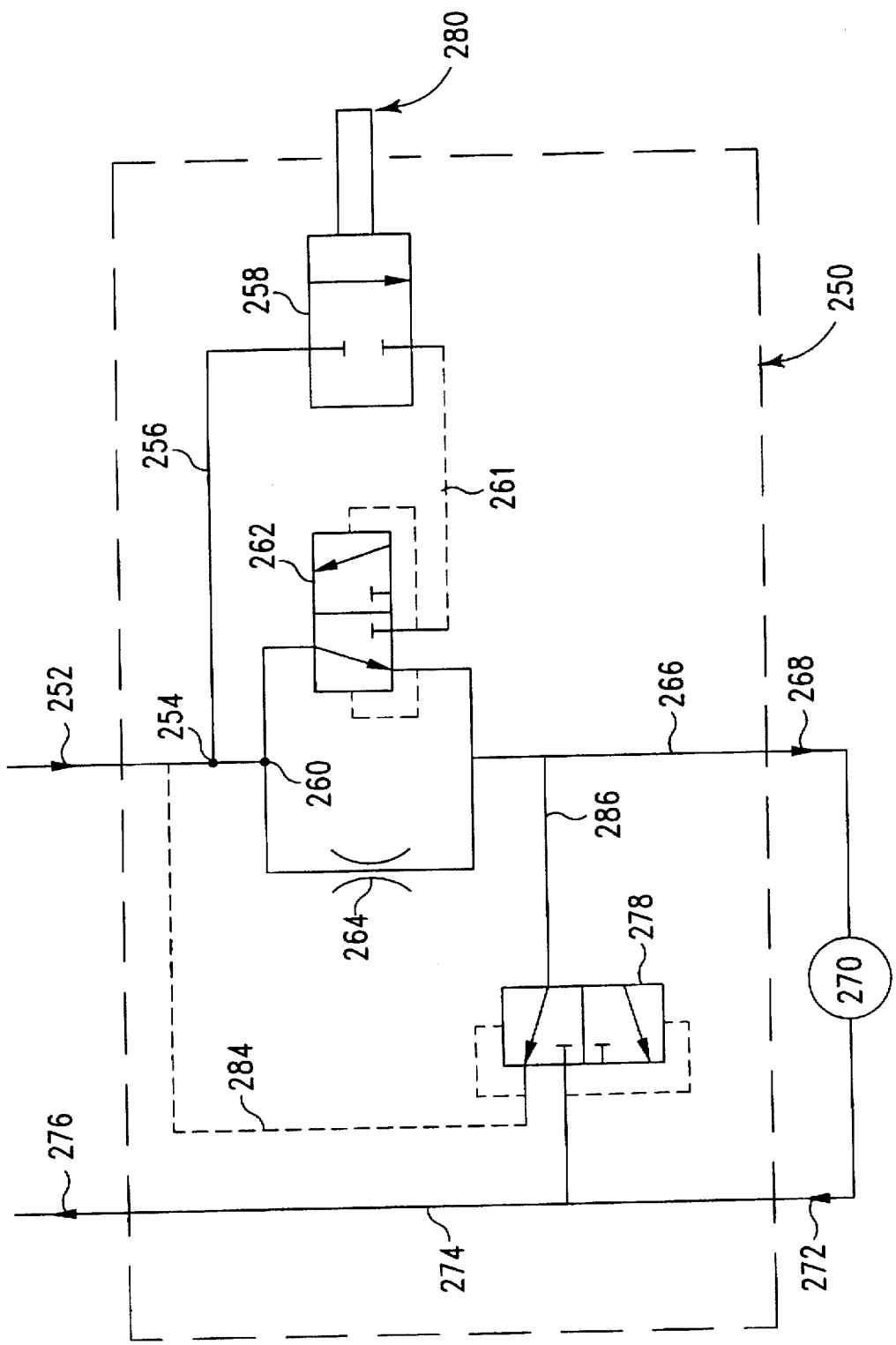
FIG. 10 is a schematic of a hydraulic manifold of another embodiment of the present invention.

Referring now to FIG. 10, there is schematically shown another embodiment of a manifold of the invention designed to interrupt mower power and hydraulically lock the mower in the power off arrangement. In this schematic, the manifold is shown in the power on arrangement delivering power to the motor. Hydraulic fluid from the hydraulic supply provided on the loader enters manifold 250 at 252. From tee 254, hydraulic fluid fills line 256 which extends to a manual two position three way valve 258 which is closed. Fluid from tee 254 also flows to tee 260 and takes the path of least resistance through a sequence valve 262 which is in an open condition. A small amount of fluid from tee 260 will also flow through fixed orifice 264 circuited in parallel with sequence valve 262. Fluid then flows through line 266 and out from the manifold at 268 to power motor 270. After passing through motor 270, hydraulic fluid returns to manifold 250 at 272, passes through line 274 and ports from manifold 250 at 276 to return to the loader hydraulic reservoir. At this state of operation, hydraulic fluid within line 266 does not bypass motor 270 through sequence valve 278, which is spring biased into the closed position shown.

Upon a mechanical signal indicated at 280 acting on an extension of valve 258 and which occurs during mower raising, valve 258 opens to pressure up the pilot section of sequence valve 262 via line 261 and causes valve 262 to close. Fluid at tee 260 is thereby forced across fixed orifice 264 to create a pressure gradient where the pressure of fluid into orifice 264 is about 500 psi and the fluid exiting orifice 264 is about 200 psi. Due to line 284 connected to the pilot section of sequence valve 278 being at 500 psi, and sequence valve feeding line 286 connected to line 266 being at 200 psi, sequence valve 278 opens. Rather than passing to motor 270, hydraulic fluid then takes the path of least resistance through sequence valve 278 to effectively bypass motor 270 and return to the loader hydraulic supply.

Sequence valve 262 is configured such as by porting so as to remain closed even upon the closing of valve 258 that occurs upon the removal of mechanical signal 280. Manifold 250 remains in this mode of mower power off until the inlet flow through 252 is shut off, ending the pressure drop across fixed orifice 264 and allowing sequence valve 278 to reclose and sequence valve 262 to reopen.

While this invention has been shown as having multiple designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A mower comprising:
    a housing;
    a cutting apparatus mounted for rotation within said housing;
    a motor for driving rotation of said cutting apparatus;
    at least one motor power line in communication with a power source and said motor;
    a detector for determining when said housing is positioned at least a predetermined distance from a surface below said housing;
    a time delay signal sender for sending a signal after passage of a time period during which said detector continuously detects said housing is positioned at least said predetermined distance from the surface below said housing; and
    an actuator mechanism for interrupting delivery of power to said motor through said at least one motor power line in response to said signal from said time delay signal sender.

2. The mower of claim 1 wherein said detector comprises a hydraulic cylinder comprising a cylinder portion, a piston component slidable within an interior volume of said cylinder portion, and a rod connected to said piston component and protruding from said cylinder portion.

3. The mower of claim 2 further comprising a support frame, wherein said rod is attached to one of said housing and said support frame, and wherein said cylinder portion is attached to the other of said housing and said support frame.

4. The mower of claim 3 wherein said support frame comprises means for mounting to raisable arms of a self-propelled vehicle.

5. The mower of claim 4 wherein said support frame further comprises rocker means for cooperating with the vehicle to maintain said hydraulic cylinder in an extended condition, wherein said rocker means includes a first portion connected to said hydraulic cylinder and a second portion adapted to engage the self-propelled vehicle when said mower is in a lowered, mowing arrangement.

6. The mower of claim 3 wherein said signal comprises a quantity of hydraulic fluid displaced from said cylinder.

7. The mower of claim 6 wherein said time delay signal sender comprises an orifice disposed within a hydraulic conduit between said cylinder and said actuator mechanism, and wherein said orifice comprises a size less than the diameter of a conduit connecting first and second chambers within said cylinder interior volume separated by said piston component, whereby transfer of fluid between said first and second chambers is delayed.

8. The mower of claim 1 further comprising a locking mechanism for preventing, after interruption by said actuator mechanism of motor power through said at least one motor power line, said actuator mechanism from resetting to allow delivery of power to said motor through said at least one motor power line until an active step by a mower operator.

9. The mower of claim 8 wherein said locking mechanism comprises hydraulic locking means.

10. A mower comprising:

a support frame;

a housing mounted to said support frame to be vertically movable relative thereto;

a cutting apparatus mounted for rotation within said housing;

a hydraulic motor for driving rotation of said cutting apparatus;

a plurality of hydraulic hoses extending between said hydraulic motor and a hydraulic fluid source, said plurality of hoses comprising a pressure line from the hydraulic source and a return line to the hydraulic source;

a detector for providing a signal when said housing moves at least a predetermined distance relative to said support frame in response to mower raising;

a hydraulic manifold including an actuating member movable in a first direction from a first position to a second position in response to said signal from said detector, said manifold adapted to deliver hydraulic power to said motor through said plurality of hydraulic hoses when said actuating member is disposed in said first position, said manifold adapted to connect in flow communication said pressure line with said return line to bypass said motor and thereby interrupt delivery of hydraulic power to said motor when said actuating member is disposed in said second position;

automatic means for locking said actuating member in said second position;

wherein said detector comprises a hydraulic cylinder connected between said housing and said support frame; and wherein said signal comprises a quantity of hydraulic fluid from said hydraulic cylinder.

11. A mower comprising:

a support frame;

a housing mounted to said support frame to be vertically movable relative thereto;

a cutting apparatus mounted for rotation within said housing;

a hydraulic motor for driving rotation of said cutting apparatus;

a plurality of hydraulic hoses extending between said hydraulic motor and a hydraulic fluid source, said plurality of hoses comprising a pressure line from the hydraulic source and a return line to the hydraulic source;

a detector for providing a signal when said housing moves at least a predetermined distance relative to said support frame in response to mower raising;

a hydraulic manifold including an actuating member movable in a first direction from a first position to a second position in response to said signal from said detector, said manifold adapted to deliver hydraulic power to said motor through said plurality of hydraulic hoses when said actuating member is disposed in said first position, said manifold adapted to connect in flow communication said pressure line with said return line to bypass said motor and thereby interrupt delivery of hydraulic power to said motor when said actuating member is disposed in said second position;

automatic means for locking said actuating member in said second position; and wherein said detector comprises means for dampening movement of said housing relative to said support frame to delay provision of said signal.

12. A mower apparatus detachably mountable on a loader including a pair of raisable lift arms and a hydraulic fluid source comprising:

a support frame including means for mounting to the loader lift arms;

a housing mounted to said support frame to be vertically movable relative thereto;

a cutting apparatus mounted for rotation within said housing;

a hydraulic motor for rotating said cutting apparatus;

a plurality of hydraulic hoses extending between said hydraulic motor and the hydraulic fluid source, said plurality of hoses comprising a pressure line and a return line;

at least one cylinder operationally connected to said housing and said support frame to detect relative movement therebetween, said at least one cylinder structured to delay shifting from a first length to a second length during detection of relative movement of said housing and said support frame;

bypass means for interrupting a flow of hydraulic fluid to said motor by circuiting said pressure line to said return line; and means for sending a signal to activate said bypass means when said at least one cylinder shifts from said first length to said second length.

13. The mower apparatus of claim 12 further comprising means for locking said bypass means in an arrangement interrupting flow of hydraulic fluid to said motor until an active step by an operator.

14. The mower apparatus of claim 13 wherein said locking means comprises a hydraulic locking means.

15. The mower apparatus of claim 12 wherein said signal sending means comprises a hydraulic signal, and wherein said hydraulic signal comprises a quantity of fluid displaced from said hydraulic cylinder during shifting of said cylinder from said first length to said second length.

* * * * *